May 7, 1946.　　A. W. MILLS ET AL　　2,399,755
ACCOUNTING MECHANISM
Filed April 1, 1944　　4 Sheets-Sheet 1

INVENTORS
ALBERT W. MILLS
FRANK J. FURMAN
EDWARD J. RABENDA
ATTORNEY

May 7, 1946.  A. W. MILLS ET AL  2,399,755
ACCOUNTING MECHANISM
Filed April 1, 1944  4 Sheets-Sheet 2

INVENTORS
ALBERT W. MILLS
FRANK J. FURMAN
EDWARD J. RABENDA

ATTORNEY

Patented May 7, 1946

2,399,755

UNITED STATES PATENT OFFICE 2,399,755

ACCOUNTING MECHANISM

Albert W. Mills and Frank J. Furman, Endicott, and Edward J. Rabenda, Binghamton, N. Y., assignors to International Business Machines Corporation, New York, N. Y., a corporation of New York Application April 1, 1944, Serial No. 529,086

3 Claims. (Cl. 235—61.6)

This invention relates to record controlled accounting machines and more particularly to machines controlled by records in which data are recorded in the form of combinationally arranged perforations.

The principal object of the invention is to provide improved control devices through which combinational perforations in a record card may be sensed and caused to directly control a differentially positionable accounting mechanism to enter therein the true value of the digits combinationally represented on the record card.

A further object of the invention is to provide improved control devices through which such entries may be made subtractively. To this end a novel system of recording has been devised utilizing only six index point positions in a column of the well known Hollerith record card to combinationally record therein any of the digits.

Other objects of the invention will be pointed out in the following description and claims and illustrated in the accompanying drawings, which disclose, by way of example, the principle of the invention and the best mode, which has been contemplated, of applying that principle.

Figure 7A:
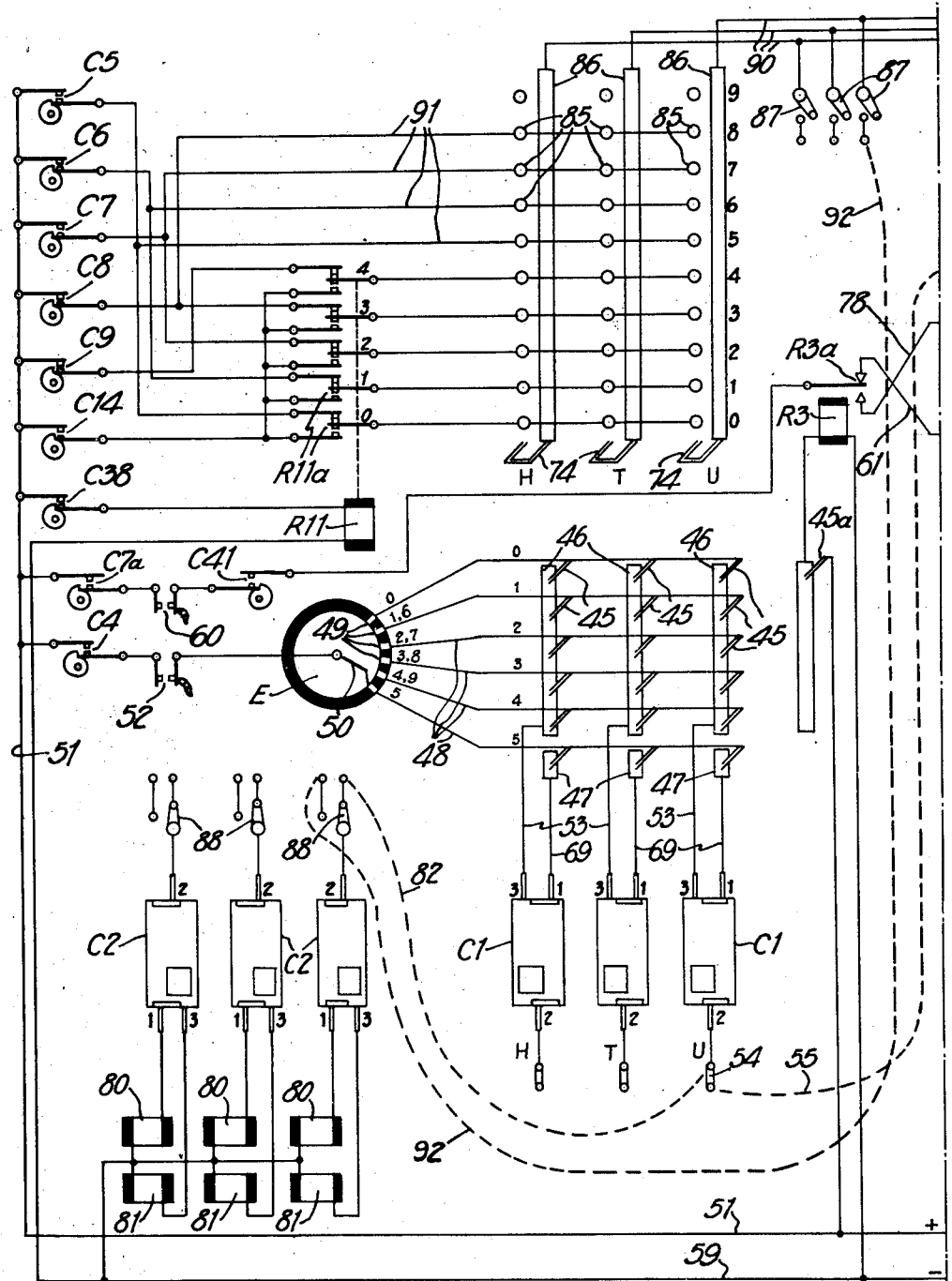
Figure 7B:
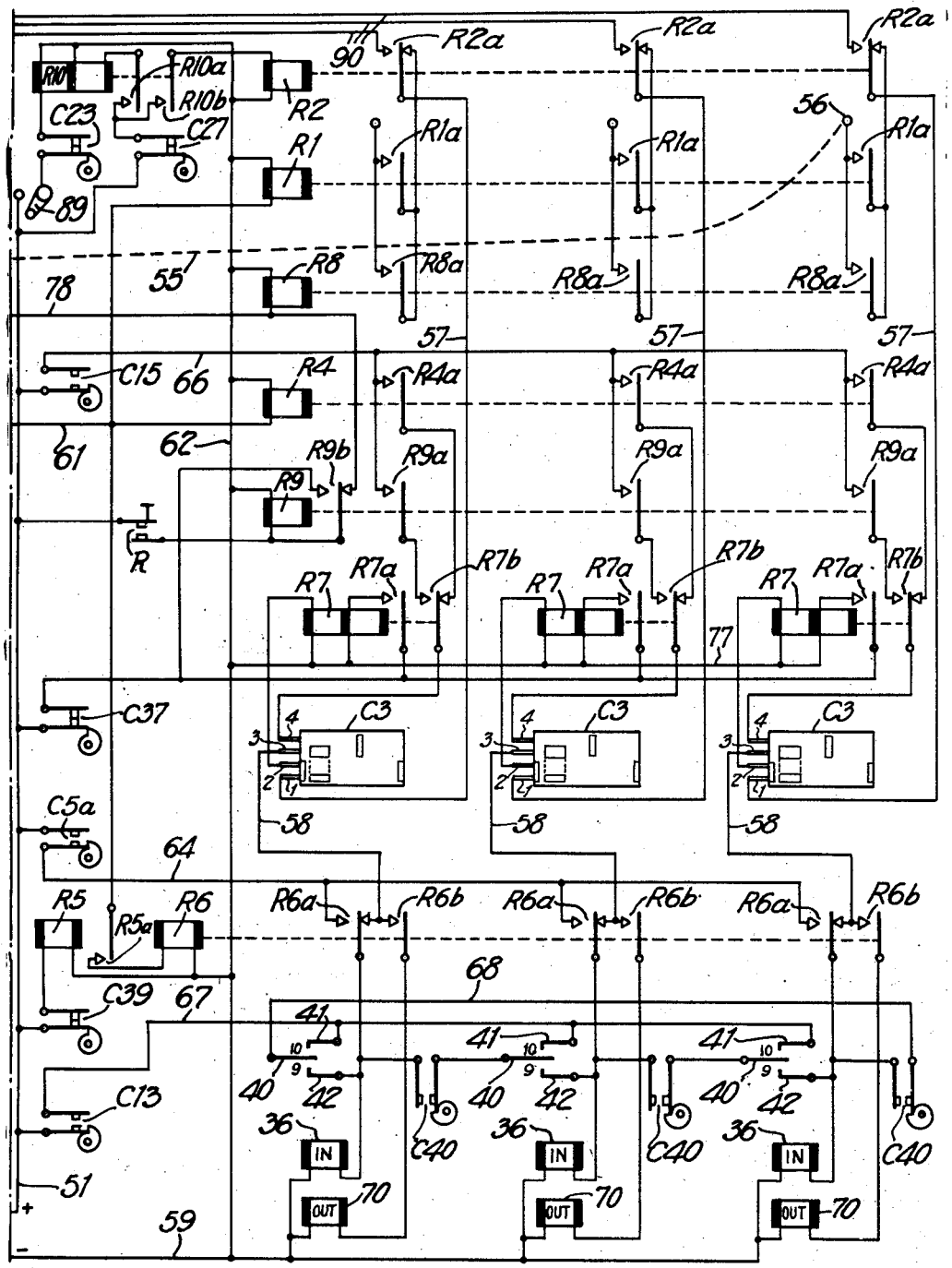

Figs. 7a and 7b taken together constitute a wiring diagram simplified to show only the elements and controls necessary for an understanding of the invention.

The card

Figure 6:
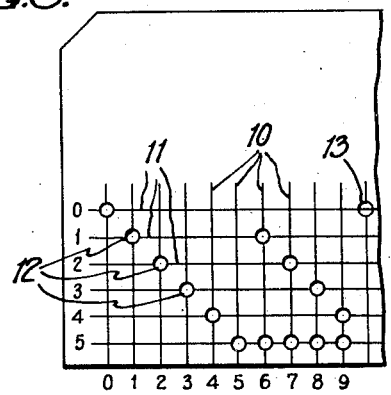
Fig. 6 is a fragment of the record card showing the novel designation position arrangement which enables direct control of the accumulator.

The record card is shown in Fig. 6 divided into columns designated by lines 10 and rows designated by lines 11. The six horizontal lines 11 are given the values 0 to 5 and a digit is represented in a vertical column by a single perforation 12 in corresponding numbered positions for the digits 0 to 5 and by a pair of perforations for the digits 6 to 9, with one of the pair of perforations being in the 5 position.

To represent a negative amount, a special designation 13 is made in the 0 position of a selected column.

The accumulator

Figure 1:
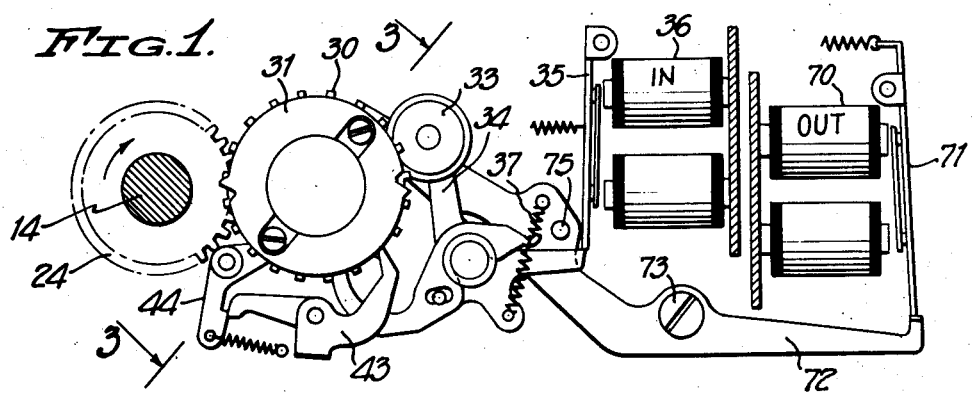
Fig. 1 is a view showing the essential operating elements of one denominational section of the accumulator.
Figure 2:
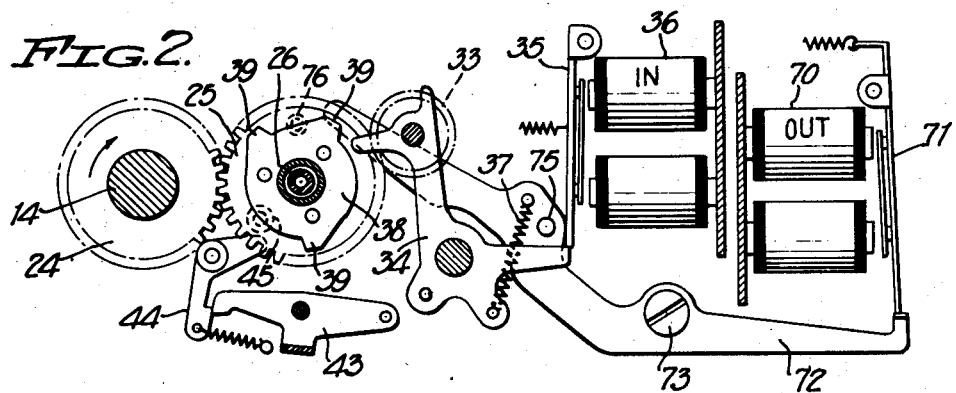
Fig. 2 is a section through the accumulator showing the improved interior construction.

The accumulator represented in Figs. 1 and 2 is illustrated and described in detail in the Mills Patent 2,165,288 granted July 11, 1939. Its operation will therefore be but briefly explained to point out wherein modification has been made for the purposes of the present invention.

Figure 3:
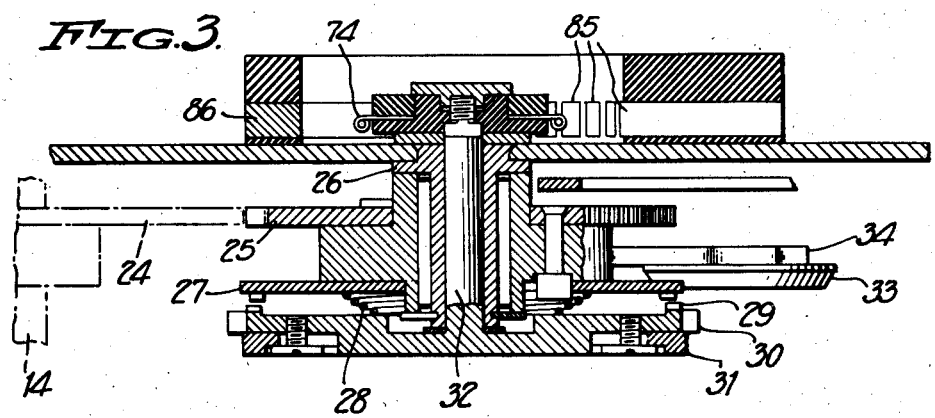
Fig. 3 is a sectional view taken along lines 3—3 of Fig. 1.
Figure 5:
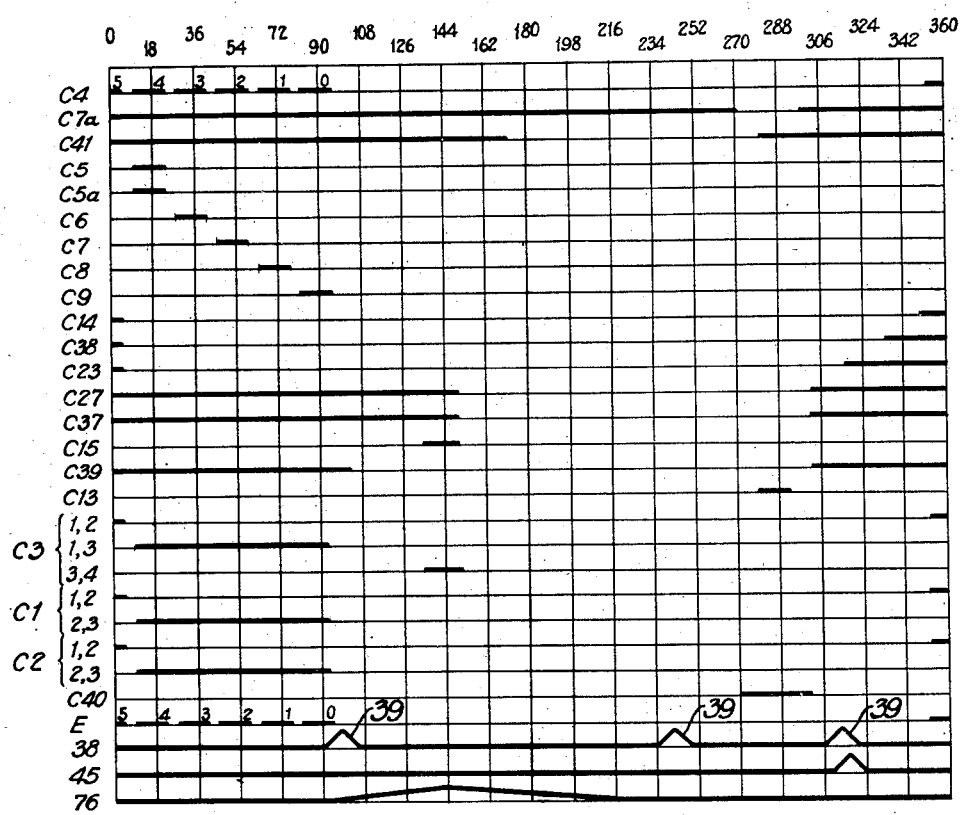
Fig. 5 is a time chart of the electrical circuit closing devices in the machine.

The shaft 14 (Fig. 1) is constantly rotating and one revolution thereof constitutes a so-called cycle of operation of the machine. This shaft 14 has secured thereto a gear 24 meshing with a gear 25 freely mounted on a post 26, and driven by gear 25 is a ratchet 27 (Fig. 3) which is axially movable but normally held in the position of Fig. 3 by a spring 28. Coaxial with driving ratchet 27 is a ratchet 29 which is part of the accumulating or adding element comprising toothed adding wheel 30 and tens carry cam 31 which are integral with a rod 32. Ratchet 27 may be rocked into engagement with ratchet 29 to drive the latter, and such rocking is effected by a bevel disk 33 carried by a bell crank 34, which is normally latched in the position shown in Figs. 1 and 2 by the armature 35 of a magnet 36 designated "in". When magnet 36 is energized, bell crank 34 is released and spring 37 will rock it to move disk 33 toward the axis of ratchet 27, thereby camming the ratchet 27 into driving engagement with the driven ratchet 29. Integral with gear 25 is a cam 38 (Fig. 2) provided with three spaced cam portions or lobes 39, each of which will effect uncoupling when it engages the nose of bell crank 34. This cam has been added to the prior adding mechanism and the time in the cycle of operations when the cam lobes 39 are effective is indicated in the diagram (Fig. 5).

Figure 4:
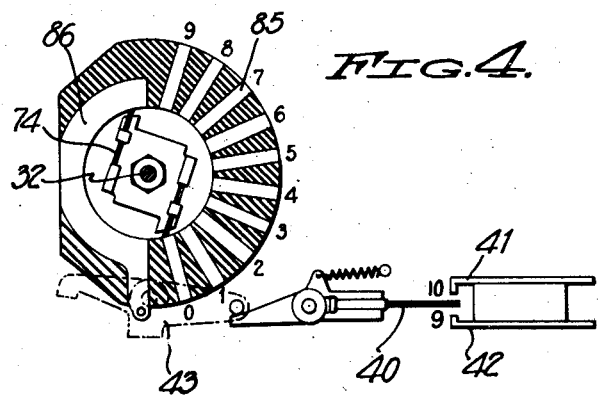
Fig. 4 is a detail of the total readout device of the accumulator.

Magnet 36 is energized at differential times, i. e. one, two, three or four so-called cycle points (18° constitutes a cycle point) before the first cam lobe 39 effects uncoupling, so that the extent of advance of the adding wheel is dependent upon such time of energization of magnet 36. The carry cam 31 controls the usual tens carry contacts comprising movable contact brush 40 (Fig. 4) and stationary blades 41 and 42 which function so that, whenever the wheel 30 passes from 9 to 0, member 43 is rocked clockwise and held by latch 44 to hold brush 40 in engagement with blade 41.

Whenever the wheel 30 stands at 9, a depression in the cam 31 will permit the member 43 to rock counterclockwise, thereby enabling brush 40 to rock clockwise and engage blade 42. The roller 45 is provided to release carry lever latch 44 at the end of the cycle.

The accumulator is also provided with a magnet 70 which, if energized after magnet 36 has effected coupling of the ratchets, will cause disengagement thereof. When magnet 70 is energized, it attracts its armature 71 and releases a lever 72 pivoted at 73 so that spring 37 will rock the lever counterclockwise and a pin 75 thereon will strike the horizontal arm of bell crank 34 and rock the same clockwise into its uncoupling position. At a predetermined point in the cycle a pin 76 engages the left end of lever 72 to relatch it on armature 71 (see Fig. 5).

Rod 32 (Fig. 4) has a pair of brushes 74 secured at one end, which cooperate with a set of spaced contact segments 85 and a common conductor 86 so that, when the accumulating wheel is positioned to represent any of the digits, one of the brushes 74 contacts the segment 85 related to that digit, and the other contacts the conductor 86.

In the operation of the machine, the several denominationally ordered wheels 30, 31 initially stand at 9 and, when a resetting operation is effected, the wheels are advanced from whatever position they may occupy to such 9 position as will be explained later. In other words, true values are represented in the accumulator by a 9's complement setting and, when an amount is to be added, a subtracting operation is in effect carried out. With such arrangement total printing and resetting of the accumulator can be effected in a single cycle of operation with a digit being printed and the related accumulator reset with a single electrical impulse. The circuits and timing are explained hereinafter under the headings "Resetting operation" and "Total printing." To simplify the disclosure, it is assumed that the balance in the accumulator represents a positive amount at all times and that no negative balance occurs.

*Card sensing devices.*—In Fig. 7a there is represented the card sensing device which comprises columns and rows of brushes 45 arranged to correspond to the spacing of the hole positions on the card. The brushes which sense the like valued hole positions are connected together and through wires 48 with segments 49 of an emitter E. A card to be sensed is positioned beneath the brushes and, where a hole occurs in a 0 to 4 line, contact is made through the hole with one of the common conductors 46. Where a hole occurs in a 5 position, contact is made with a separate segment 47. With a card in place, card lever contacts 52 and 60 are closed by the card.

The card sensing devices are thus diagrammatically represented as a stationary set of columns of brushes between which the card may be manually inserted for sensing thereof, at rest, and when so inserted the hole positions will correspond with related sensing brushes. For automatic successive card feeding, a card feeding mechanism such as is shown in Peirce Patent 1,926,882 may be employed to advance a card to the sensing brushes for each cycle of operation and hold it in position for a portion of a cycle.

*Adding operation.*—Let it be assumed that a column of the card contains a 2 perforation in the column sensed by the right hand row of brushes 45 and a 0 perforation in the other two columns. As stated, the accumulator stands at 999 initially and through the circuits now to be traced the value 998 (tens complement of 2) will in effect be added thereto and leave the accumulator standing at 997, which is the 9's complement of 2.

With the card in place, the machine is sent through a cycle represented by a revolution of shaft 14, upon which shaft are mounted several circuit closing cams and distributors whose timing is shown in Fig. 5. At the beginning of the cycle a circuit is traceable from positive line 51 (Fig. 7a), contacts C7a, card lever contacts 60, contacts C41, upper contacts R3a, wire 61 (Fig. 7b), relays R1 and R4, wire 62 to negative line 59. At the same time there is a circuit traceable from line 51 (Fig. 7b), contacts C39, relay R5, wire 62 to line 59. Relay R5 closes its contacts R5a so that the circuit previously traced to wire 61 extends through contacts R5a to energize relay R6 in parallel with relays R1 and R4.

When contacts C5a now close shortly after the beginning of the cycle, there is a circuit completed from line 51, contacts C5a, wire 64, all left hand contacts R6a (now closed due to energization of relay R6), and all "in" magnets 36 to line 59. As a result, all the accumulator wheels are coupled to their driving ratchets and all commence to turn. Brush 50 of an emitter E (Fig. 7a) contacts segments 49 at times indicated in Fig. 5 and, for the units card column in which there is a 2 perforated, a circuit will be completed after the units wheel has advanced two steps, which circuit is traceable from line 51, contacts C4, 52, brush 50, the 2, 7 segment 49, the 2 wire 48, brush 45 in the right hand column, the 2 hole in the card, conductor 46, wire 53, brushes 3 and 2 of a distributor C1 (see Fig. 5 which indicates that brushes 2 and 3 of distributor C1 are electrically connected at this time), plug socket 54, connection 55 (Fig. 7b), socket 56, contacts R1a (closed due to prior energization of relay R1), right hand contacts R2a, wire 57, brushes 1 and 3 of distributor C3 (see Fig. 5), wire 58, contacts R6b (now closed), the "out" magnet 70 to line 59. This causes uncoupling of the units order wheel after it has made two steps of rotation.

In the two higher orders, similar circuits are completed two steps later when brush 50 contacts the 0 segment 49, so that in these two higher orders uncoupling is effected after four steps of advance. The punching of zeros in these higher orders is not essential and may be omitted, since at the time of completion of the circuits just traced the first lobe 39 of cam 38 (Fig. 5) will effect positive mechanical uncoupling. Therefore, at this point in the cycle the three accumulator wheels will have been advanced from a setting of 999 to 331. Cam contacts C39 open to deenergize relay R5, and as a result relay R6 also deenergizes and its contacts R6a and R6b shift back to their normal positions.

Later, when contacts C15 close (see Fig. 5), parallel circuits are completed from line 51 (Fig. 7b), contacts C15, wire 66, contacts R4a (still closed), right hand contacts R7b, brushes 4 and 3 of distributor C3, wires 58, right hand contacts R6a and "in" magnets 36 to line 59. All the accumulator wheels thus are again coupled for driving, and after five steps of movement the second lobe 39 of cam 38 (Fig. 5) effects mechanical uncoupling with the wheels now advanced from 331 to 886.

It will be recalled that all wheels initially stood at 9 and, since all have now advanced through zero, all the carry brushes 40 are latched in contact with their tens contacts 41. Therefore, at carry time when contacts C13 (Fig. 7b) close, a circuit is completed from line 51, contacts C13, wire 67, all the tens contacts 41, brushes 40 and contacts C40 (closed at this time) to magnets 36 in the next higher order in the case of the units and tends orders. In the highest order the circuit extends from brush 40, through wire 68, contacts C40 to magnet 36 in the lowest order. Thus, all accumulating wheels are again coupled and after one step the third lobe 39 of cam 38 effects uncoupling, leaving all wheels advanced one step from 886 to 997, which is the 9's complement of the 2 which is added.

Briefly, when the digit 2 is added to the initial setting of 999 for the example under consideration, a 2, a 5 and a 1 are entered in succession; when the digit 1 is added, a 3, a 5 and a 1 are entered in succession; when the digit 3 is added, a 1, a 5 and a 1 are entered in succession; and when a 4 is added, only a 5 and a 1 are entered, since in the last case the circuit through the 4, 9 segment 49 occurs simultaneously with the circuit through contacts C5a, so that magnets 36 and 70 are energized together and coupling is not effected.

For the digits 5 to 9, the operation is the same with the exception that the operation of adding 5 through contact C15 is omitted. This is brought about as follows. At the very beginning of the cycle, the 5 hole is sensed when brush 50 of emitter E contacts the 5 segment 49 and a circuit is completed from line 51, contacts C4, 52, brush 50, 5 segment 49, wide 48, brush 45, 5 hole, segment 47, wire 69, brushes 1 and 2 of distributor C1 (Fig. 5), socket 54, connection 55 (Fig. 7b), socket 56, contacts R1a, R2a (right), wire 57, brushes 1 and 2 of emitter C3, a winding of relay R7, and wire 77 to line 59. Relay R7 closes its contacts R7a to provide a holding circuit from line 51, contacts C37, contacts R7a, a second winding of relay R7 and wire 77 to line 59. This shifts contacts R7b so that, when contacts C15 close (while relay R7 is still energized) no circuit is completed at that time.

All the magnets 36 are energized concurrently with the contacting of the 4 segment 49 and disengagement occurs when a 4, 3, 2, 1 or 0 hole is sensed and, if no such hole is present, disengagement occurs mechanically after four steps of movement as before. Briefly, when the digit 5 is added, a 4 and a 1 are entered in succession; when the digit 6 is added, a 3 and a 1 are entered in succession; when the digit 7 is entered, a 2 and a 1 are entered in succession; when a 8 is entered, a 1 and a 1 are entered in succession; when a 9 is entered, a 0 and a 1 are entered in succession. Through the circuit arrangement disclosed, it follows, therefore, that with the accumulator initially standing at 9 in all orders (which is the 9's complement of zero), an amount is added by entering the 10's complement thereof in increments and the sum or result is manifested in the form of the 9's complement of such sum. Briefly, the adding of a 9's complement to a 9's complement standing in the accumulator will cause a carry from the highest to the lowest order to add a fugitive one thereto and change the added value to a 10's complement. In the particular example where the initial setting involved 9's in all orders, a tens carry occurred into all orders higher than units and the units order received the fugitive one entry from the highest order carry contacts. In other cases where the complement may represent different values, the 10's carries will be effected in accordance with such carry requirements, but the fugitive one entry from highest to lowest order will take place for each amount added in the form of a complement.

*Subtracting operation.*—When the card contains an amount to be subtracted, the special hole 13 (Fig. 6) is present and this hole is sensed by 0 brush 45a (Fig. 7a) to complete a circuit from line 51, brush 45a, hole in the card, relay R3 to line 59. Relay R3 shifts its contacts R3a so that at the beginning of the cycle there is a circuit from line 51, contacts C7a, 60, C41, lower contacts R3a, wire 78 (Fig. 7b), and relay R8, wire 62, to line 59. A parallel circuit extends through contacts R9b (right) to relay R9, wire 62 to line 59. Relay R9 closes its contacts R9b (left) before the right hand contacts open to establish a holding circuit through contacts C37.

Now as the 4 to 0 holes are sensed, circuits are completed to directly energize the magnets 36, of which the following is representative: from line 51 (Fig. 7a), contacts C4, 52, brush 50, 4 segment 49, wire 48, 4 brush 45, 4 hole, conductors 46, wire 53, brushes 3 and 2 of distributor C1, socket 54, connection 55 (Fig. 7b), socket 56, contacts R8a, R2a (right), wire 57, brushes 1 and 3 of distributor C3, wire 58, contacts R6a (right) and magnet 36 to line 59. At 0 time (Fig. 5), mechanical declutching takes place and the wheel is advanced a number of steps equal to its value 4 to 0. Where a 5 hole appears in the digit combination, an additional 5 is added as follows. At the beginning of the cycle a circuit is traceable from line 51, contacts C4, 52, brush 50, 5 segment 49, 5 wire 48, 5 brush 45, 5 hole, segment 47, wire 69, brushes 1 and 2 of distributor C1, socket 54, connection 55, socket 56, contacts R8a, R2a (right), wire 57, brushes 1 and 2 of distributor C3 and relay R7, wire 77, to line 59. Relay R7 is held as before and, when contacts C15 close, a circuit is completed five steps before the second mechanical uncoupling, traceable from line 51, contacts C15, wire 66, contacts R9a (now closed), R7b (left), brushes 4 and 3 of distributor C3 (Fig. 5), wire 58, contact R6a (right), and magnet 36 to line 59. At tens carry time as before, a unit is entered in appropriate orders.

Briefly, when the digit 1 is subtracted, a 1 is added; when the digit 2 is subtracted, a 2 is added; when the digit 3 is subtracted, a 3 is added; when the digit 4 is subtracted, a 4 is added; when the digit 5 is subtracted, a 5 is added; when the digit 6 is subtracted, a 1 and a 5 are added; when the digit 7 is subtracted, a 2 and a 5 are added; when the digit 8 is subtracted, a 3 and a 5 are added; when the digit 9 is subtracted, a 4 and a 5 are added. Thus, for an initial setting of, say, 234 representing the amount 765, subtraction of about 123 will cause 123 to be added to 234, leaving 357 standing in the accumulator to represent the difference 642.

*Print controlling circuits.*—In our copending application Serial No. 515,373, filed December 23, 1943, there is disclosed a printing mechanism of which the controlling circuits are shown in the lower left hand corner of Fig. 7a. These include a pair of magnets 80 and 81 which when energized through circuits branching from socket 54 through a connection 82, will cause positioning of type bars. Inasmuch as the details of such print mechanism are not necessary to an understanding of the present invention, they are not shown herein. Suffice it to state that magnet 81 is energized in response to the sensing of holes in the 4 to 0 positions, and magnet 80 is energized in response to the sensing of a hole in the 5 position through a distributor C2 whose timing is given in Fig. 5.

*Resetting operation.*—As previously stated, resetting consists in advancing all wheels to their 9 position, if they are not already in such position, and is effected by sending the machine through a single cycle of operation after sets of switches 87 and 88 (Fig. 7a) and switch 89 (Fig. 7b) have been shifted from the positions shown. Upon closure of switch 89, relay R10 becomes energized through contacts C23 and closes its contacts R10a and R10b, the former of which establish a holding circuit through contacts C27 and the latter of which cause energization of relay R2, so that contacts R2a are now shifted to connect wires 57 with wires 90 extending to the common conductors 86 (Fig. 7a).

The brushes 74 of the accumulator readout device will, of course, have been differentially positioned to connect related conductors 86 with the individual segments 85 corresponding to the digits standing in the accumulator. These segments 85 are connected through wires 91 with cam contacts C5 to C9 and C14 and to contacts R11a of a relay R11. At the beginning of the cycle, cam contacts C38 energize relay R11 to shift the contacts R11a momentarily at the time contacts C14 are closed. This is for the purpose of ascertaining if there is a 0 to 4 setting on any brush 74.

Let it be assumed that there is a 1 setting in the units order. Then, there will be a circuit traceable from line 51, contacts C14, 1 contacts R11a (lower), 1 segment 85, brush 74, common 86, uppermost wire 90 (Fig. 7b), contacts R2a (left), wire 57, brush 1 and 2 of distributor C3, and relay R7 to wire 77 and line 59. Energization of relay R7 as already explained will cause a 5 to be added later in the cycle. The circuit for adding 5 goes through contacts C15 and R9a as before and requires that contacts R9a be closed as a preliminary. For this purpose, key contacts R are provided to initially energize relay R9 and contacts C37 will hold it energized until after the 5 entry circuit is effective. In the meantime, when contacts C6 close (Fig. 7a), a circuit is completed from line 51, contacts C6, the 1 contacts R11a (upper), the 1 segment 85, brush 74, common 86, uppermost wire 90 (Fig. 7b), contacts R2a (left), wire 57, brushes 1 and 3 of distributor C3, wire 58, contact R6a (right) and magnet 36 to line 59. This circuit is timed to cause the entry of a 3 in the units order to advance it from 1 to 4 and the later addition of 5 will advance it to 9.

From inspection of Figs. 5 and 7a, it will be apparent that for digits 0 to 4 the same circuit is completed to cause a 5 to be added later, and in the case of a 4 setting a 0 is first entered; in the case of a 3 setting a 1 is first entered; in the case of a 2 setting a 2 is first entered; in the case of a 1 setting a 3 is first entered; in the case of a 0 setting a 4 is first entered.

Where the digital setting is 5 to 8, the extra 5 is not added in and for a 5 setting a 4 is directly entered; for a 6 setting a 3 is directly entered; for a 7 setting a 2 is directly entered; for an 8 setting a 1 is direcly entered.

Thus, during a cycle of operation all wheels are advanced to 9 in readiness for further adding and subtracting operations.

*Total printing.*—With switches 87 (Fig. 7a) closed, all circuits to wires 98 branch through switch 87, a plug connection 92, shifted switch 88, distributor C2 to magnets 80 and 81. Due to the time of completion of the circuits for the various settings of brushes 74, these magnets will be energized in the same manner as though the true digital value were sensed in a card column. For example, a setting of a brush 74 at 6 will send an impulse to magnet 80 at the same time as the sensing of a 3 hole in a card column. A setting of a brush 74 at 1 will send impulses to the magnets 81 and 80 at the same time as the sensing of a 5 and a 3 hole to print an 8.

For the sake of simplification of the disclosure, the machine is shown as a single cycle device but it will be apparent that continuous card feeding may be employed by providing mechanism for bringing record cards in succession to the sensing brushes and holding them in position during the period that contacts C4 (Fig. 15) close. In such case, the C cams and emitter E would rotate continuously making one revolution for each card fed and sensed.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable machine of the class described, means for sensing a record card, said card having a column of index point positions, one for each of the digits 5, 4, 3, 2, 1 and 0, in which positions the significant digits 0 to 5 are represented by designations made in the corresponding positions and in which the digits 6 to 9 are represented by a designation in the 5 position accompanied by a second designation in a position whose value added to 5 equals the digit to be designated, an accumulator including a plurality of ordered accumulating elements, each settable to represent all the digits and normally set to represent the digit 9 driving means, an adding clutch mechanism for each element for coupling said element to the driving means, a first uncoupling means, a second uncoupling means, cyclically operable means for concurrently operating the adding clutch mechanisms, means controlled by said sensing means in response to sensing designations in the 0 to 4 index point positions for causing said second uncoupling means to operate after the related element has advanced an amount representing the addition of the difference between the designation value and 4, a second cyclically operable means for causing a second operation of the adding clutch mechanisms at a time so that said first uncoupling means will cause uncoupling after a 5 has been added, means controlled by said sensing means when a designation is sensed in the 5 index point position of a column for disabling the second cyclically operable means to prevent the second operation of the adding clutch mechanism in the related order, a third uncoupling means and tens carry devices between successive orders and between the highest and lowest orders, said highest to lowest order carry device causing a further operation of the adding clutch mechanism at a time so that said third uncoupling means will operate to add a unit in the lowest order element.

2. In a cyclically operable machine of the class described, means for sensing a record card, said card having a column of index point positions, one for each of the digits 5, 4, 3, 2, 1 and 0, in which positions the significant digits 0 to 5 are represented by designations made in the corresponding positions and in which the digits 6 to 9 are represented by a designation in the 5 position accompanied by a second designation in a position whose value added to 5 equals the digit to be designated, an accumulator including a plurality of ordered accumulating elements, each settable to represent all the digits and normally set to represent the digit 9, driving means, cyclically operable means for causing addition of a 4 in each element, further cyclically operable means for causing addition of a 5 in each element, means controlled by said sensing means upon sensing a designation in the 5 index point position for preventing the operation of said further means in the related ordered element, means controlled by said sensing means upon sensing a designation in the 1 to 4 index point positions for superseding the operation of said first named cyclically operable means to cause addition of an amount in the related element equal to the difference between the value of the designated position and 4, and tens carry mechanism between successive orders and between the highest and lowest orders, said highest to lowest order carry mechanism being effective for adding a unit in the lowest order element, whereby the accumulator will represent the 9's complement of the sum of the amount sensed in the record card and the initial entry in the accumulator.

3. A resetting mechanism for an accumulator having denominational order elements which are all positionable to represent 9 when reset, comprising devices positionable by the elements to represent an entry in the accumulator, circuit connections, means controlled by each positionable device when set to represent one of the digits for controlling the completion of said circuit connections at differential times in accordance with said entries, means included in said circuit connections for differentially initiating an advance of the accumulating elements of each order, devices for interrupting the advance of any element when it reaches a 9 or a 4 setting, and further means controlled by each positionable device when set to represent one of the digits 0 to 4 for controlling the completion of the said circuit connections a second time, concurrently, said interrupting devices interrupting said second advance when any readvanced element reaches a 9 setting, whereby initial settings of 5 to 8 are advanced to 9 and initial settings of 0 to 4 are first advanced to 4 and thereafter readvanced to 9.

ALBERT W. MILLS.
FRANK J. FURMAN.
EDWARD J. RABENDA.